United States Patent [19]

Nagahiro et al.

[11] Patent Number: 4,994,544

[45] Date of Patent: Feb. 19, 1991

[54] PRODUCTION PROCESS FOR POLYIMIDE FIBERS

[75] Inventors: Taizo Nagahiro, Tokyo; Masahiro Ohta, Kanagawa; Shuichi Morikawa, Kanagawa; Nubohito Koga, Kanagawa; Shoji Tamai, Kanagawa, all of Japan

[73] Assignee: Mitsui Toatsu Chemicals, Inc., Tokyo, Japan

[21] Appl. No.: 431,779

[22] Filed: Nov. 6, 1989

[30] Foreign Application Priority Data

Nov. 7, 1988 [JP] Japan .................. 63-279280
Oct. 18, 1989 [JP] Japan .................. 1-268985

[51] Int. Cl.$^5$ .................. C08G 8/02
[52] U.S. Cl. .................. 528/125; 528/176; 528/183; 528/185; 528/188; 528/189; 528/352; 528/353; 264/176.1
[58] Field of Search .............. 528/125, 176, 183, 185, 528/188, 189, 352, 353; 264/176.1

[56] References Cited

U.S. PATENT DOCUMENTS 4,485,140 11/1984 Gannett et al. .................. 428/260
4,681,928 7/1987 Berger et al. .................. 528/353
4,725,642 2/1988 Gannett et al. .................. 524/600

Primary Examiner—Morton Foelak
Assistant Examiner—S. A. Acquah
Attorney, Agent, or Firm—Burns, Doane, Swecker & Mathis

[57] ABSTRACT

A process for the production of polyimide fibers and polyimide fibers obtained by the process. The process includes thermal or chemical imidation of a polyamic acid which has been obtained by reacting a specific diamine and a particular tetracarboxylic dianhydride in the presence of a dicarboxylic anhydride represented by the following formula:

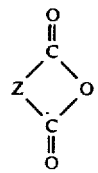

wherein Z represents a divalent group selected from the group consisting of monocyclic aromatic groups, fused polycyclic aromatic groups and non-fused polycyclic aromatic groups with aromatic rings bonded together directly or via a crosslinking member.

19 Claims, 1 Drawing Sheet

FIG.1

PRODUCTION PROCESS FOR POLYIMIDE FIBERS

BACKGROUND OF THE INVENTION (a) Field of the Invention

The present invention relates to a process for the production of polyimide fibers having excellent heat resistance, chemical resistance, radiation resistance, mechanical strength and productivity.

(b) Description of the Related Art:

Aromatic polyimide fibers produced by direct heat melt spinning have heretofore been disclosed only once before in Japanese Patent Application Laid-Open No. 211319/1988, by the present assignee. This publication discloses high-strength and high-elasticity polyimide fibers made of a novel polyimide which permits melt spinning and has good processability. However, the above polyimide fibers are accompanied by problems such that the discharge rate tends to decrease upon long-time continuous spinning due to thickening of the molten resin and/or clogging of the filter and end breakage also takes place frequently upon spinning or stretching. They are therefore still not satisfactory in productivity.

In the meantime, the present assignee filed an application with the Japanese Patent Office (Japanese Patent Application No. 266191/1987). The application claims a specific process for the production of a polyimide, wherein the production process comprises conducting the reaction between a specific diamine and a particular tetracarboxylic dianhydride in the presence of a specific dicarboxylic anhydride. This process can provide a polyimide in which each high-molecular chain is blocked at both ends thereof with the dicarboxylic anhydride. A resin which can be obtained by thoroughly pre-drying the polyimide to adjust its water content to less than 200 ppm, preferably to less than 50 ppm does not undergo any substantial flowability reduction even when exposed to high temperatures for a long time, so that the resin has excellent processability in melt forming such as injection molding and extrusion.

SUMMARY OF THE INVENTION

An object of the present invention is to provide high-strength polyimide fibers which can be produced by stable and smooth spinning and stretching for a long time without impairing the heat resistance, chemical resistance and mechanical strength of the aromatic polyimides disclosed in Japanese Patent Application Laid-Open No. 211319/1988 and which are free from foaming and coloration upon spinning and stretching and are free of gelation products.

Another object of this invention is to provide a novel application field for the production process of Japanese Patent Application No. 266191/1987.

The above objects can be achieved in accordance with the following process.

The process of this invention is a production process for polyimide fibers having, as a basic skeletal structure, recurring units represented by the following formula (IV):

wherein X represents a group selected from the group consisting of a direct bond, a divalent hydrocarbon group having 1-10 carbon atoms, a hexa-fluorinated isopropylidene group, a carbonyl group, a thio group and a sulfonyl group and R represents a tetravalent group selected from the group consisting of aliphatic groups having at least 2 carbon atoms, alicyclic groups, monocyclic aromatic groups, fused polycyclic aromatic groups and non-fused polycyclic groups with aromatic rings bonded together directly or via a crosslinking member, and includes thermally or chemically imidating a polyamic acid, which has been obtained by reacting a diamine and a tetracarboxylic dianhydride, into a polyimide and then spinning the polyimide or spinning the polyamic acid and then thermally or chemically imidating the thus-spun polyamic acid, the improvement wherein:

(a) the diamine comprises a diamine represented by the following formula (I):

wherein X has the same meaning as defined above;

(b) the tetracarboxylic dianhydride comprises a tetracarboxylic dianhydride represented by the following formula (II):

wherein R has the same meaning as defined above;

(c) the reaction is conducted in the presence of a dicarboxylic anhydride represented by the following formula (III):

wherein Z represents a divalent group selected from the group consisting of monocyclic aromatic groups, fused polycyclic aromatic groups and non-fused polycyclic aromatic groups with aromatic rings bonded together directly or via a crosslinking member; and (d) said tetracarboxylic dianhydride comprises a tetracarboxylic dianhydride represented by the formula (II) and said dicarboxylic anhydride are in proportions of 0.9-1.0 mole and 0.001-1.0 mole, respectively per mole of said diamine comprised a diamine represented by the formula (I).

DESCRIPTION OF THE PREFERRED EMBODIMENTS

Illustrative examples of the X in the formula (I) of the diamine include —S—, —CO—, —SO$_2$—, —CH$_2$—, Illustrative examples of the diamine represented by the formula (I) and employed for the production of the polyimide, which is useful in the practice of the present invention, include bis[4-(3-aminophenoxy)phenyl]methane, 1,1-bis[4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)-3-methylphenyl]propane, 2,2-bis[4-(3-aminophenoxy)-3-methylphenyl]propane, 2-[4-(3-aminophenoxy)phenyl]-2-[4-(3-aminophenoxy)-3,5-dimethylphenyl]propane, 2,2-bis[4-(3-aminophenoxy)-3,5-dimethylphenyl]propane, 2,2-bis[4-(3-aminophenoxy)phenyl]butane, 2,2-bis[4-(3-aminophenoxy)phenyl]-1,1,1,3,3,3-hexafluoropropane, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfone. They can be used either singly or in combination.

It is totally permissible to substitute a further diamine (outside the definition of formula (I)) for a portion of one or more of the above-exemplified diamines as long as the good physical properties of the polyimide used in the present invention are not impaired. Such a further diamine may account for 1.0–50.0 mol % of the total amount of diamine.

Exemplary diamines which can substitute for a portion of the aforementioned diamine include m-phenylenediamine, o-phenylenediamine, p-phenylenediamine, m-aminobenzylamine, p-aminobenzylamine, bis(3-aminophenyl) ether, (3-aminophenyl)(4-aminophenyl) ether, bis(4-aminophenyl) ether, bis(3-aminophenyl) sulfide, (3-aminophenyl)(4-aminophenyl) sulfide, bis(4-aminophenyl) sulfide, bis(3-aminophenyl) sulfoxide, (3-aminophenyl) (4-aminophenyl) sulfoxide, bis(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, bis[4-(4-aminophenoxy)phenyl]methane, 1,1-bis[4-(4-aminophenoxy)phenyl]ethane, 1,2-bis[4-(4-aminophenoxy)phenyl]ethane, 2,2-bis[4-(4-aminophenoxy)phenyl]ethane, 2,2-bis[4-(4-aminophenoxy)phenyl]propane, 2,2-bis[4-(4-aminophenoxy)phenyl]butane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl] sulfoxide, bis[4-(4-aminophenoxy)phenyl] sulfide, bis[4-(3-aminophenoxy)-phenyl] ether, bis[4-(4-aminophenoxy)phenyl] ether, 1,4-bis[4-(3-aminophenoxy)benozyl]benzene, 1,3-]4-(3-aminophenoxy)benzoyl]benzene, etc.

On the other hand, illustrative examples of the R in the formula (II) of the tetracarboxylic dianhydride include As examples of the tetracarboxylic dianhydride represented by formula (II) and useful in the production of the polyimide employed in this invention, may be mentioned ethylenetetracarboxylic dianhydride, butanetetracarboxylic dianhydride, cyclopentanetetracarboxylic dianhydride, pyromellitic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, 2,2',3,3'-benzophenonetetracarboxylic dianhydride, 3,3'-4,4'-biphenyltetracarboxylic dianhydride, 2,2',3,3'-biphenyltetracarboxylic dianhydride, bis(3,4-dicarboxyphenyl) ether dianhydride, bis(2,3-dicarboxyphenyl) ether dianhydride, bis(3,4-dicarboxyphenyl) sulfone dianhydride, 4,4'-(p-phenylenedioxy)diphthalic dianhydride, 4,4'-(m-phenylenedioxy) diphthalic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzonetetracarboxylic dianhydride, 3,4,9,10-perylenetetracarobyxlic dianhydride, 2,3,6,7-anthracenetetracarboxylic dianhydride, 1,2,7,8-phenanthrenetetracarboxylic dianhydride, and so on. These tetracarboxylic dianhydrides can be used either singly or in combination.

Illustrative examples of the dicarboxylic anhydride represented by the formula (III) and useful in the production of the polyimide employed in this invention include phthalic anhydride, 2,3-benzophenonedicarboxylic anhydride, 3,4-benzophenone dicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3anthracenedicarboxylic anhydride, 1,9-anthracenedicarboxylic anhydride, and the like. They can be used either singly or in combination. Phthalic anhydride, biphenyldicarboxylic anhydrides or benzophenonedicarboxylic anhydrides are preferably employed.

Regarding the proportions of said amine, tetracarboxylic dianhydride and dicarboxylic anhydride, said tetracarboxylic dianhydride comprises a tetracarboxylic dianhydride represented by the formula (II) and said dicarboxylic anhydride are in proportions of 0.9-1.0 mole and 0.001-1.0 mole, respectively per mole of said diamine comprised of a diamine represented by the formula (I).

It is the routine practice that the ratio of the tetracarboxylic dianhydride to the diamine can be selected to control the molecular weight of the resulting polyimide upon production of the polyimide. To obtain a polyimide having good melt flowability, the molar ratio of the tetracarboxylic dianhydride to the diamine should be controlled within 0.9-1.0 in the process of the present invention.

The dicarboxylic anhydride, which is present in the reaction, is used at a molar ratio of 0.001-1.0 relative to the diamine. Molar ratios smaller than 0.001 do not permit stable spinning and stretching, thereby failing to fulfill the objects of the present invention. On the other hand, molar ratios greater than 1.0 result in reduced mechanical properties. The preferred molar ratio may range from 0.01 to 0.5.

As long as the above-described reactants are used, the polyimide useful in the practice of this invention can be obtained no matter how they are reacted. It is however preferable to conduct the reaction in an organic solvent.

Exemplary organic solvents useful for the reaction include N,N-dimethylformamide, N,N-dimethylacetamide, N,N-diethylacetamide, N,N-dimethylmethoxy acetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, p-cresol, p-chlorophenol, anisole, etc. These organic solvents can be used either singly or in combination.

Upon production of the polyimide for use in the process of the present invention, the starting materials, i.e., the diamine, tetracarboxylic dianhydride and dicarboxylic anhydride may be added to the organic solvent and then reacted in any manner, including:

(a) the diamine and tetracarboxylic dianhydride are reacted, followed by the addition of the dicarboxylic anhydride to continue the reaction further;

(b) the dicarboxylic anhydride is added to the diamine to react them together, followed by the addition of the tetracarboxylic dianhydride to continue the reaction further; or

(c) the diamine, tetracarboxylic dianhydride and dicarboxylic anhydride are added at the same time to react them together.

The reaction is conducted at a temperature of from 0° C to 250° C, in general 60° C or less.

No particular limitation is imposed on the reaction pressure. The reaction can be satisfactorily conducted under normal pressure.

Although the reaction time varies depending on the kinds of diamine, tetracarboxylic dianhydride, dicarboxylic anhydride and solvent and the reaction temperature used, 4-24 hours are generally long enough to complete the reaction.

By these reactions, there is formed a polyamic acid having, as a basic skeletal structure, recurring units of the following formula (V):

wherein X and R have the same meanings as defined above.

By heating and dehydrating the polyamic acid at 100°-400° C or by subjecting the polyamic acid to chemical imidation with a conventional imidating agent, for example, triethylamine and acetic anhydride or the like, the corresponding polyimide having recurring units of the following formula (IV) as a basic skeletal structure can be obtained.

wherein X have the same meanings as defined above.

In general, a polyamic acid is formed at a lower temperature, followed by its thermal or chemical imidation. It is however possible to simultaneously conduct the formation of the polyamic acid and the thermal imidation reaction at 60°-250° C to obtain a polyimide. Namely, the diamine, tetracarboxylic dianhydride and aromatic dicarboxylic anhydride are either suspended or dissolved in the organic solvent and are then reacted under heat to conduct the formation of the polyamic acid and its dehydration and imidation at the same time, whereby the polyimide having recurring units of the above formula (IV) as a basic skeletal structure can also be obtained.

Figure 1:
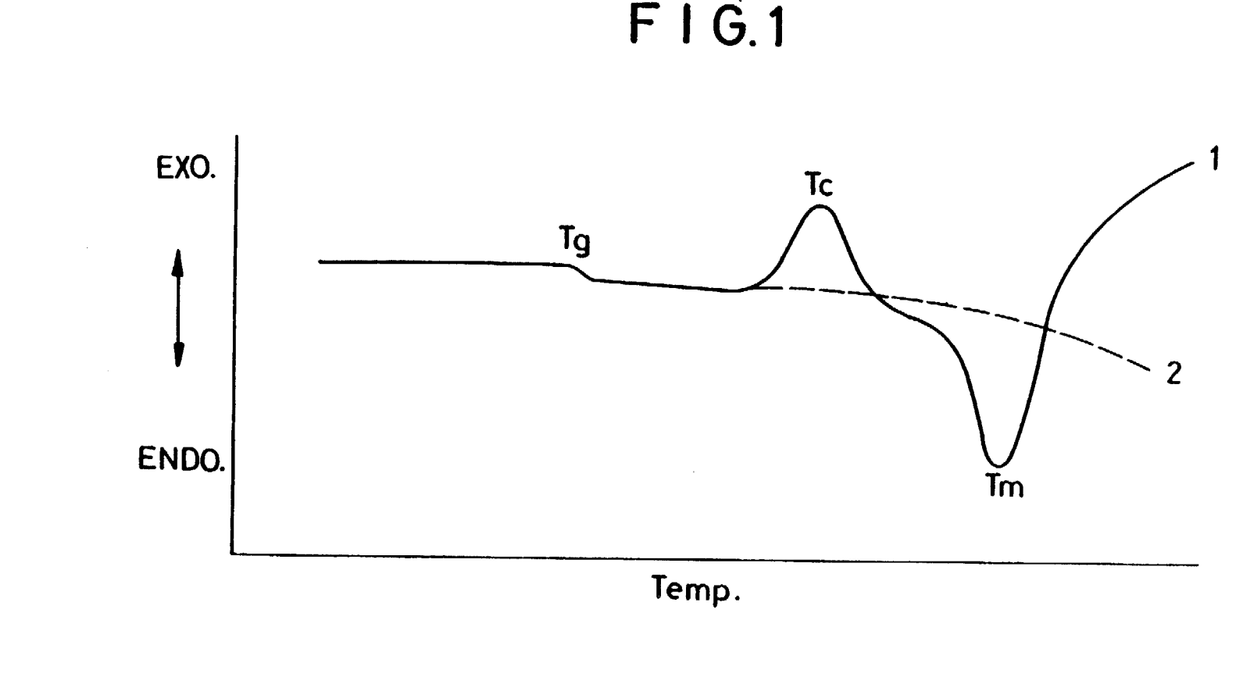
FIG. 1 shows differential thermal characteristics of polyimide resins usable in the present invention as analyzed by a differential scanning calorimeter (DSC).

The thus-obtained polyimide is a thermoplastic resin which can be melt-formed. Typical thermal differential characteristic curves of an exemplary polyimide are shown in FIG. 1, in which Curve ① indicates the thermal differential characteristics of the polyimide in a crystalline form and Curve ② represents those of the same polyimide in a non-crystalline form. Further, Tg, Tc and Tm stand for glass transition temperature, crystallization temperature and melting temperature, respectively. Tg of the polyimide slightly varies depending on the kinds of the tetracarboxylic dianhydride, diamine and dicarboxylic anhydride used in combination but generally appears at 180°–265° C or so. Tc is usually found at about 290°–330° C but in some instances, may not appear. On the other hand, Tm appears around 365°–395° C in general but in some instances, may not be seen. For the formation of fibers, it is most preferable from an economical standpoint to conduct melt spinning by direct heating. In addition, as disclosed in Japanese Patent Application Laid-Open No. 211319/1988, polyimide fibers similar to those produced by melt spinning can also be obtained by wet-spinning an organic solvent solution of the polyamic acid, which is a precursor of the polyimide and is represented by the formula (V), in a coagulating bath to form polyamic acid fibers and then subjecting them to heat treatment or chemical treatment to achieve their imidation by heat.

When melt spinning is performed, the polyimide employed in this invention is thoroughly pre-dried to control its water content to less than 200 ppm or preferably to less than 50 ppm. When the polyimide shows crystallinity as indicated by Curve ① in FIG. 1, the polyimide is melted in a heating cylinder of a screw or plunger extruder within a temperature of from $(Tm+5)°$ C to $(Tm+100)°$ C, preferably from $(Tm+10)°$ C to $(Tm+50)°$ C. On the other hand, where the polyimide does not show crystallinity as indicated by Curve ②, the polyimide is melted in the heating cylinder of the screw or plunger extruder within a temperature of from $(Tg+50)°$ C to $(Tg+180)°$ C preferably from $(Tg+80)°$ C to $(Tm+140)°$ C. The thus melted polyimide is discharged in the form of a monofilament or multifilaments through a nozzle provided at a tip portion of the extruder. The monofilament or multifilaments are taken up while being cooled and solidified, so that spinning is achieved. Incidentally, a fine-mesh filter may be inserted in front of the nozzle with a view toward removing foreign matters or gelation products. The unstretched spun filaments thus obtained are then subjected to hot stretching, for example, at a draw ratio of 1.01–5 in a single stage or multiple stages within a temperature range of from $(Tg-50)°$ C to Tm, preferably $(Tg-30)°$ C to Tc where the filaments exhibit crystallinity as indicated by curve ① in FIG. 1 or within a temperature range of from $(Tg-50)°$ C to $(Tg+5)°$ C, preferably $(Tg-30)°$ C to $(Tg+30)°$ C where the filaments exhibit non-crystallinity as indicated by Curve ②. Stretching can be conducted using a conventionally-known apparatus of the non-contact type such as a heating furnace or of the contact type such as an apparatus of the hot plate or heating nozzle passing type.

The stretched filaments thus obtained are then subjected to heat treatment under tension or no tension as needed, for example, within a temperature range of from Tg to Tm, preferably $(Tg+30)°$ C to $(Tm-30)°$ C where the filaments exhibit crystallinity as indicated by Curve ① in FIG. 1 or within a temperature range of from $(Tg-30)°$ C to $(Tg+30)°$ C, preferably $(Tg-20)°$ $(Tg-20)°$ C to Tg where the filaments don't show crystallinity as indicated by Curve ② in FIG. 1.

The process of the present invention for the production of polyimide fibers makes it possible to avoid, upon spinning and stretching of the fibers, thickening or gelation attributable probably to the coupling of ends of high molecular chains and foaming and coloration caused by the formation of decomposed gas attributable probably to thermal decomposition of the ends. It is accordingly possible to solve the problem of end breakage so that smooth and continuous spinning and stretching are feasible for a long time.

According to this invention, polyimide fibers range widely from multifilaments whose monofilaments are several deniers to monofilaments which are about 1 mm across, are useful as industrial fibers, are excellent in heat resistance, chemical resistance, radiation resistance and mechanical strength, and can be produced stably and economically.

EXAMPLE 1:

A reactor fitted with a stirrer, a reflux condenser and a nitrogen inlet tube was charged with 368 g (1.0 mole) of 4,4'-bis(3-aminophenoxy)biphenyl and 5215 g of N,N-dimethylacetamide. At room temperature and in a nitrogen gas atmosphere, 211.46 g (0.97 mole) of pyromellitic anhydride were added in portions while paying attention to avoid any significant temperature increase of the reaction mixture, and the resultant mixture was stirred at room temperature for about 20 hours.

At room temperature and in a nitrogen gas atmosphere, 22.2 g (0.15 mole) of phthalic anhydride were added to the thus-obtained polyamic acid solution. The thus-obtained mixture was stirred for a further 1 hour. Then, 404 g (4 moles) of triethylamine and 306 g (3 moles) of acetic anhydride were added dropwise to the mixture. In about 1 hour after completion of the dropwise addition, yellow polyimide powder began to precipitate. The mixture was stirred at room temperature for a further 10 hours, followed by filtration. The precipitate was then dispersed and washed in methanol, collected by filtration and thereafter dried at 180° C for 2 hours, thereby obtaining 536 g of polyimide powder. The powder showed crystallinity. The glass transition temperature Tg, melting temperature Tm and crystallization temperature Tc shown in FIG. 1 were 256° C., 378° C and 306° C, respectively. Further, the logarithmic viscosity of the polyimide powder was 0.53 dl/g. Here, the logarithmic viscosity was measured at 35° C and a polymer concentration of 0.5 g per 100 ml of a 90:10 by weight mixed solvent of parachlorophenol and phenol.

The thus-obtained polyimide powder was extruded through a nozzle having a single circular hole of 3 mm across by means of a screw extruder equipped with a heating cylinder controlled at 400° C (screw diameter: 25 mm; L/D: 24; equipped with a force vacuum vent). The extrudate was air-cooled, thereby obtaining polyimide pellets of 2 mm across and 3 mm long. Incidentally, the vacuum level of the forced vent was 10 Torr during the operation. Next, those pellets were extruded at a predetermined constant screw revolutionary speed through a nozzle defining fine circular holes of 0.8 mm across by means of a screw extruder equipped with a heating cylinder controlled at 400° C (screw diameter: 10 mm; L/D: 20; ventless type; a 10 μm filter was provided in front of the nozzle). By controlling the take-up speed of the spinning, Single Polyimide Yarns A having a diameter of 300 μm and Single Polyimide Yarns B having a diameter of 100 μm were obtained under air-cooling.

The above operation was continued for 10 hours. No end breakage took place during the operation so that stable spinning was feasible.

In addition, the indication of a resin pressure gauge provided in front of the filter was 40 kg/cm² at the initiation of the operation and 55 kg/cm² upon an elapsed time of 10 hours. The filter was only slightly clogged. The resultant two types of single polyimide yarns whose diameters were 300 μm and 100 μm respectively were subjected to single-stage stretching at a draw ratio of 2.5 and a stretching speed of 60 folds/min (i.e., stretched to a 60-times length in 1 minute) in a heating furnace controlled at 240° C, thereby obtaining Stretched Filaments A1 and B1.

A1 and B1 were next subjected to heat treatment under no tension for 30 minutes in a heating furnace controlled at 300° C, thereby obtaining heat-treated Stretched Filaments A2 and B2.

Similarly, exactly the same stretching was conducted in a heating furnace controlled at 280° C, thereby obtaining Stretched Filaments A3 and B3. They were then subjectd to similar heat treatment at 300° C, thereby obtaining heat-treated Stretched Filaments A4 and B4.

The tensile strength and tensile elongation of each resultant polyimide fiber sample were measured in accordance with JIS-L-1813 (1981). The results are given in Table 1.

EXAMPLE 2:

A similar reactor to Example 1 was charged with 400 g (1.0 mole) of bis[4-(3-aminophenoxy)phenyl]sulfide and 5503 g of N,N-dimethylacetamide. At room temperature and in a nitrogen gas atmosphere, 211.46 g (0.97 mole) of pyromellitic dianhydride were added in portions while paying attention to avoid any significant temperature increase of the reaction mixture, and the resultant mixture was stirred at room temperature for about 20 hours.

At room temperature and in a nitrogen gas atmosphere, 22.2 g (0.15 mole) of phthalic anhydride were added to the thus-prepared polyamic acid solution. The thus-obtained mixture was stirred for a further 1 hour. Then, 404 g (4.0 moles) of triethylamine and 306 g (3.0 moles) of acetic anhydride were added dropwise to the mixture. After completion of the dropwise addition, the mixture was stirred at room temperature approximately for a further 10 hours and then poured into about 10 kg of methanol. The resultant precipitate was collected by filtration, dispersed and washed in methanol, collected again by filtration, and then dried at 180° C for 6 hours under reduced pressure, thereby obtaining 570 g of polyimide powder. It did not show crystallinity. The glass transition temeprature Tg shown in FIG. 1 was 208° C. Its logarithmic viscosity as measured in accordance with the measuring method described in Example 1 was 0.47 dl/g.

From the polyimide powder obtained as described above, polyimide pellets were obtained at a heating cylinder temperature at 350° C in the same manner as in Example 1. Then, Single Polyimide Yarns E having a diameter of 250 μm were obtained.

The above spinning operation was continuously conducted for 10 hours like Example 1. During the spinning operation, no end breakage took place so that stable spinning was feasible. The resultant polyimide yarns were subjected to single-stage stretching under the same conditions as in Example 1 in a heating furnace controlled at 230° C, thereby obtaining Stretched Filaments E1. Next, heat-treated Stretched Filaments E2 were obtained undersimilar conditions to Example 1 in a heating furnace controlled at 200° C. In a similar manner to Example 1, a tensile test was conducted on the thus-obtained polyimide fibers. The results are shown in Table 1.

EXAMPLE 3:

A similar reactor to Example 1 was charged with 410 g (1.0 mole) of 2,2-bis[4-(3-aminophenoxy)phenyl]propane and 6500 g of N,N-dimethylacetamide. At room temperature and in a nitrogen gas atmosphere, 312.34 g (0.97 mole) of 3,3',4,4'-benzophenonetetracarboxylic dianhydride were added in portions while paying attention to avoid any significant temperature increase of the reaction mixture, and the resultant mixture was stirred at room temperature for about 20 hours.

At room temperature and in a nitrogen gas atmosphere, 37.8 g (0.15 mole) of 3,4-benzophenonedicarboxylic anhydride were added to the thus-prepared polyamic acid solution. The thus-obtained mixture was stirred for a further 1 hour. Then, 404 g (4.0 moles) of triethylamine and 306 g (3.0 moles) of acetic anhydride were added dropwise to the mixture. After completion of the dropwise addition, the mixture was stirred at room temperature approximately for a further 10 hours and then poured into about 10 kg of methanol. The resultant precipitate was collected by filtration, dispersed and washed in methanol, collected again by filtration, and then dried at 180° C for 6 hours under reduced pressure, thereby obtaining 676 g of polyimide powder. It did not show crystallinity. The glass transition temperature Tg shown in FIG. 1 was 190° C. Its logarithmic viscosity as measured in accordance with the measuring method described in Example 1 was 0.49 dl/g.

From the polyimide powder obtained as described above, polyimide pellets were obtained at a heating cylinder temperature of 340° C. in the same manner as in Example 1. Then, Single Polyimide Yarns G having a diameter of 270 μm were obtained.

The above spinning operation was continuously conducted for 10 hours like Example 1. During the spinning operation, no end breakage took place so that stable spinning was feasible. The resultant polyimide yarns were subjected to single-stage stretching under the same conditions as in Example 1 in a heating furnace controlled at 210° C, thereby obtaining Stretched Filaments G1. Next, heat-treated Stretched Filaments G2 were obtained under similar conditions to Example 1 in a heating furnace controlled at 180° C. In a similar manner to Example 1, a tensile test was conducted on the thus-obtained polyimide fibers. The results are shown in Table 1.

COMPARATIVE EXAMPLE 1:

In a similar manner to Example 1 except for the omission of the reaction with phthalic anhydride, 529 g of polyimide powder was obtained.

The glass transition temperature Tg, melting temperature Tm and crystallization temperature Tc, shown in FIG. 1, of the polyimide powder were 260° C, 385° C and 312° C, respectively. Further, the logarithmic viscosity of the polyimide powder was 0.52 dl/g. Using the polyimide thus obtained, extrusion pelletization and melt spinning were conducted in exactly the same manner as in Example 1.

During the melt spinning conducted as a continuous operation, the indication of a resin pressure gauge provided in front of a filter was 50 kg/cm² at the time of initiation of the operation but increased to 100 kg/cm² 1 hour later and to 200 kg/cm² 1.5 hours later. Accordingly, there was a potential danger that a load exceeding the rated torque capacity of the extruder would exerted on the extruder. The operation was therefore stopped. In 30 minutes from the initiation of the continuous operation, end breakages began to take place. Frequent end breakages took place after an elapse of 1 hour, so that continuous spinning was no longer feasible.

In the course of the operation, relatively good single yarns having a diameter of 350 μm were obtained as Single Polyimide Yarns C in an initial stage of the operation, and single polyimide yarns having a diameter of 330 μm were also obtained as Single Polyimide Yarns D in a period after an elapsed time of 1 hour, in which period no end breakage took place unexpectedly. Compared with Single Polyimide Yarns A, B and C, Single Polyimide Yarns D did not have luster in the surface appearance, and many knots which were considered to be gelation products were observed in the surface.

Single Polyimide Yarns C and D thus obtained were stretched in exactly the same manner as in Example 1. Single Polyimide Yarns D however underwent end breakage during the stretching so that no stretched yarns were obtained. Single Polyimide Yarns C were stretched separately at 240° C and 280° C, whereby Stretched Yarns C1 and C2 were obtained. Those Stretched Yarns C1 and C2 were subjected to heat treatment at 300° C., thereby obtaining Yarns C3 and C4. The tensile strength and tensile elongation of each of those polyimide fiber samples thus obtained were measured in accordance with JIS-L-1813 (1981). The results are also given in Table 1.

COMPARATIVE EXAMPLE 2:

In a similar manner to Example 2 except for the omission of the reaction with phthalic anhydride, 550 g of polyimide powder was obtained.

The glass transition temperature Tg, shown in FIG. 1, of the polyimide powder was 215° C. Further, the logarithmic viscosity of the polyimide powder was 0.49 dl/g. Using the polyimide thus obtained, extrusion pelletization and melt spinning were conducted in exactly the same manner as in Example 1.

During the melt spinning conducted as a continuous operation, the indication of a resin pressure gauge provided in front of a filter was 50 kg/cm² at the time of initiation of the operation but increased to 100 kg/cm² 40 minutes later and to 200 kg/cm² 1.0 hour later. Accordingly, there was a potential danger that a load exceeding the rated torque capacity of the extruder would be exerted on the extruder. The operation was therefore stopped. In 20 minutes from the initiation of the continuous operation, end breakages began to take place. Frequent end breakages took place after an elapse of 30 minutes, so that continuous spinning was no longer feasible.

In the course of the operation, relatively good single yarns having a diameter of 300 μm were obtained as Single Polyimide yarns F in an initial stage of the operation. Compared with single Polyimide Yarns E, Single Polyimide Yarns F did not have luster in the surface appearance, and many knots which were considered to be gelation products were observed in the surface.

Single Polyimide Yarns F thus obtained were streteched in exactly the same manner as in Example 2, thereby obtaining Stretched Yarns F1. Single Polyimide Yarns F1 were subjected to heat treatment under the same conditions as in Example 2. The tensile strength and tensile elongation of the thus-obtained polyimide fibers were measured in accordance with JIS-L-1813 (1981). The results are also shown in Table 1.

COMPARATIVE EXAMPLE 3:

In a similar manner to Example 3 except for the omission of the reaction with 3,4-benzophenonedicarboxylic anhydride, 665 g of polyimide powder was obtained.

The glass transition temperature Tg, shown in FIG. 1, of the polyimide powder was 198° C. Further, the logarithmic viscosity of the polyimide powder was 0.47 dl/g. Using the polyimide thus obtained, extrusion pelletization and melt spinning were conducted in exactly the same manner as in Example 1.

During the melt spinning conducted as a continuous operation, the indication of a resin pressure gauge provided in front of a filter was 50 kg/cm² at the time of initiation of the operation but increased to 100 kg/cm² 45 minutes later and to 200 kg/cm² 60 minutes later. Accordingly, there was a potential danger that a load exceeding the rated torque capacity of the extruder would be exerted on the extruder. The operation was therefore stopped. In 20 minutes from the initiation of the continuous operation, end breakages began to take place. Frequent end breakages took place after an elapse of 30 minutes, so that continuous spinning was no longer feasible.

In the course of the operation, relatively good single yarns having a diameter of 330 μm were obtained as Single Polyimide Yarns H in an initial stage of the operation. Compared with Single Polyimide Yarns G, Single Polyimide Yarns H did not have luster in the surface appearance, and many knots which were considered to be gelation products were observed in the surface.

Single Polyimide Yarns H thus obtained were stretched in exactly the same manner as in Example 3, thereby obtaining Stretched Yarns H1. Single Polyimide Yarns H1 were subjected to heat treatment under the same conditions as in Example 3. The tensile strength and tensile elongation of the thus-obtained polyimide fibers were measured in accordance with JIS-L-1813 (1981). The results are also shown in Table 1. As may be seen from Table 1, substantially the same tensile strength and tensile elongation were observed between the examples and the corresponding comparative examples.

TABLE 1

|  | Stretched yarns | Draw ratio | Stretching temperature, °C | Heat treatment | Tensile strength, g/d | Tensile elongation, % |
|---|---|---|---|---|---|---|
| Example | A1 | 2.5 | 240 | Not applied | 6.2 | 14.5 |
|  | A2 | 2.5 | 240 | 300° C /30 min | 18.5 | 3.5 |
|  | A3 | 2.5 | 280 | Not applied | 4.5 | 18.3 |
|  | A4 | 2.5 | 280 | 300° C /30 min | 11.8 | 4.8 |
|  | B1 | 2.5 | 240 | Not applied | 8.7 | 12.0 |
|  | B2 | 2.5 | 240 | 300° C /30 min | 24.4 | 3.2 |
|  | B3 | 2.5 | 280 | Not applied | 5.1 | 16.5 |
|  | B4 | 2.5 | 280 | 300° C /30 min | 15.5 | 3.9 |

TABLE 1-continued

| | Stretched yarns | Draw ratio | Stretching temperature, °C | Heat treatment | Tensile strength, g/d | Tensile elongation, % |
|---|---|---|---|---|---|---|
| | E1 | 2.5 | 230 | Not applied | 5.2 | — |
| | E2 | 2.5 | 230 | 200° C /30 min | 5.4 | — |
| | G1 | 2.5 | 210 | Not applied | 6.5 | — |
| | G2 | 2.5 | 210 | 180° C /30 min | 7.0 | — |
| Comparative | C1 | 2.5 | 240 | Not applied | 7.8 | 8.4 |
| Example | C2 | 2.5 | 240 | 300° C /30 min | 27.2 | 3.0 |
| | C3 | 2.5 | 280 | Not applied | 10.5 | 9.5 |
| | C4 | 2.5 | 280 | 300° C /30 min | 21.8 | 4.1 |
| | D1 | 2.5 | End breakage occurred upon stretching. | | | |
| | D2 | 2.5 | Measurement of physical properties was infeasible. | | | |
| | D3 | 2.5 | | | | |
| | F1 | 2.5 | 230 | Not applied | 5.6 | — |
| | F2 | 2.5 | 230 | 200° C /30 min | 6.2 | — |
| | H1 | 2.5 | 210 | Not applied | 7.0 | — |
| | H2 | 2.5 | 210 | 180° C /30 min | 7.2 | — |

We claim:

1. In a process for producing polyimide fibers having, as a basic skeletal structure, recurring units represented by the following formula (IV):

wherein X represents a group selected from the group consisting of a direct bond, a divalent hydrocarbon group having 1–10 carbon atoms, a hexa-fluorinated isopropylidene group, a carbonyl group, a thio group and a sulfonyl group and R represents a tetravalent group selected from the group consisting of aliphatic groups having at least 2 carbon atoms, alicyclic groups, monocyclic aromatic groups, fused polycyclic aromatic groups and non-fused polycyclic groups with aromatic rings bonded together directly or via a crosslinking member, said process including thermally or chemically imidating a polyamic acid, which has been obtained by reacting a diamine and a tetracarboxylic dianhydride, into a polyimide and then spinning the polyimide or spinning the polyamic acid and then thermally or chemically imidating the thus-spun polyamic acid, the improvement wherein:

(a) the diamine comprises a diamine represented by the following formula (I):

wherein X has the same meaning as defined above;
(b) the tetracarboxylic dianhydride comprises a tetracarboxylic dianhydride represented by the following formula (II):

wherein R has the same meaning as defined above;
(c) the reaction is conducted in the presence of a dicarboxylic anhydride represented by the following formula (III):

wherein Z represents a divalent group selected from the group consisting of monocyclic aromatic groups, fused polycyclic aromatic groups and non-fused polycyclic aromatic groups with aromatic rings bonded together directly via crosslinking member;
(d) said tetracarboxylic dianhydride comprises a tetracarboxylic dianhydride represented by the formula (II) and said dicarboxylic anhydride are in proportions of 0.9–1.0 mole and 0.0001–1.0 mole, respectively per mole of said diamine comprised of a diamine represented by the formula (I); and
(e) the water content of the polyimide or polyamic acid prior to spinning is less than 200 ppm.

2. The process of claim 1, wherein X is a direct bond.

3. The process of claim 1, wherein X is a divalent hydrocarbon group having 1–10 carbon atoms.

4. The process of claim 1, wherein X is —CH$_2$—,

5. The process of claim 1, wherein X is a hexa-fluorinated isopropylidene group.

6. The process of claim 1, wherein X is a carbonyl, thio or sulfonyl group.

7. The process of claim 1, wherein the diamine represented by the formula (I) is 4,4'-bis(3-aminophenoxy)-biphenyl, 2,2-bis[4-(3-aminophenoxy)phenyl]propane or bis[4-(3-aminophenoxy)phenyl]sulfone.

8. The process of claim 1, wherein R is an aliphatic group having at least 2 carbon atoms or an alicyclic group.

9. The process of claim 1, wherein R is a group selected from the group consisting of monocyclic aromatic groups, fused polycyclic aromatic groups, and non-fused polycyclic aromatic groups with aromatic rings bonded together directly or via a crosslinking member.

10. The process of claim 1, wherein R is a monocyclic aromatic group.

11. The process of claim 1, wherein the tetracarboxylic dianhydride represented by the formula (II) is pyromellitic dianhydride or 3,3'-4,4'-benzophenonetetracarboxylic dianhydride.

12. The process of claim 1, wherein the dicarboxylic anhydride represented by the formula (III) is at least one dicarboxylic anhydride selected from the group consisting of phthalic anhydride, biphenyldicarboxylic anhydride and benzophenone dicarboxylic anhydride.

13. The process of claim 1, wherein Z is a monocyclic aromatic group.

14. The process of claim 1, wherein the dicarboxylic anhydride is used in a proportion of 0.01–0.5 mole per mole of the diamine.

15. The process of claim 1, wherein the glass transition temperature $T_g$ of the polyimide is 235°–265° C.

16. The process of claim 1, wherein melt-spinning is conducted.

17. The process of claim 15, further comprising adjusting the water content of the polyimide to less than 200 ppm prior to the melt-spinning.

18. The process of claim 1, further comprising stretching and heat treatment subsequent to the spinning.

19. Polyimide fibers obtained in accordance with the process of claim 1.

* * * * *

UNITED STATES PATENT AND TRADEMARK OFFICE
CERTIFICATE OF CORRECTION

PATENT NO. : 4,994,544

DATED : February 19, 1991

INVENTOR(S) : Taizo Nagahiro et al.

It is certified that error appears in the above-identified patent and that said Letters Patent is hereby corrected as shown below:

On the title page, in item [75]:
Amend fourth inventor's name from "Nubohito" to --Nobuhito--.

In column 14, line 36: After "directly" insert --or--; and line 41: Amend "0.0001" to --0.001--.

Signed and Sealed this

Sixth Day of October, 1992

Attest:

DOUGLAS B. COMER

Attesting Officer

Acting Commissioner of Patents and Trademarks